(12) United States Patent
Yamamoto

(10) Patent No.: US 9,751,181 B2
(45) Date of Patent: Sep. 5, 2017

(54) DISTANCE MEASUREMENT HOLDER AND MACHINE TOOL HAVING INTERFERING OBJECT SENSING FUNCTION

(71) Applicant: FANUC Corporation, Yamanashi (JP)

(72) Inventor: Yasuyuki Yamamoto, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 14/300,794

(22) Filed: Jun. 10, 2014

(65) Prior Publication Data

US 2014/0362387 A1 Dec. 11, 2014

(30) Foreign Application Priority Data

Jun. 11, 2013 (JP) ................................ 2013-122467

(51) Int. Cl.
 *B25H 1/10* (2006.01)
 *B23Q 17/22* (2006.01)
 (Continued)

(52) U.S. Cl.
 CPC ..... *B23Q 17/2233* (2013.01); *B23Q 17/2428* (2013.01); *B25H 1/0092* (2013.01); *B25H 1/10* (2013.01)

(58) Field of Classification Search
 CPC ................................................ B23Q 17/2233
 See application file for complete search history.

(56) References Cited

U.S. PATENT DOCUMENTS 5,257,884 A * 11/1993 Stolz .................. B23B 31/1074
  408/239 R
2001/0005265 A1 * 6/2001 Kimba et al. ................ 356/630
 (Continued)

FOREIGN PATENT DOCUMENTS

CN 201815920 U 5/2011
DE 102009039540 A1 4/2010
 (Continued)

OTHER PUBLICATIONS

Office Action mailed Sep. 30, 2014, corresponding to Japanese patent application No. 2013-122467.
 (Continued)

*Primary Examiner* — Rebecca C Bryant
(74) *Attorney, Agent, or Firm* — Hauptman Ham, LLP

(57) ABSTRACT

A distance measurement holder is attached to the main shaft of a machine tool. A laser beam emitted from a holder main body is reflected by a reflection mirror section fixed to a tapered sleeve, and reflected by a measurement target, and then received by a light receiving section provided in the holder main body. The tapered sleeve is fit into the main shaft and supported to be rotatable relative to the holder main body. The distance measurement holder is shaped such that the angle of a side surface of the reflection mirror section changes in accordance with the rotation angle of the main shaft. The distance measurement holder thus configured determines the distance between the main shaft and the measurement target to determine whether or not a jig, a workpiece, the main shaft, and a cutting tool interfere with each other in the range of a rapid positioning motion specified in an NC program.

1 Claim, 10 Drawing Sheets

(51) Int. Cl.
*B23Q 17/24* (2006.01)
*B25H 1/00* (2006.01)

(56) References Cited

U.S. PATENT DOCUMENTS

| | | | | |
|---|---|---|---|---|
| 2010/0141957 A1* | 6/2010 | Hou | ........................ | G01B 11/26 356/487 |
| 2010/0288089 A1 | 11/2010 | Miyamoto et al. | | |
| 2013/0077083 A1* | 3/2013 | Suzuki | .................. | G01S 7/4817 356/4.01 |

FOREIGN PATENT DOCUMENTS

| | | | |
|---|---|---|---|
| JP | 55-40924 | A | 3/1980 |
| JP | 2-130401 | A | 5/1990 |
| JP | 3-129404 | A | 6/1991 |
| JP | 11-114741 | A | 4/1999 |
| JP | 2006-305729 | A | 11/2006 |
| JP | 2007-203431 | A | 8/2007 |
| JP | 2008-155327 | A | 7/2008 |
| JP | 2009-265023 | A | 11/2009 |
| JP | 2010-48662 | A | 3/2010 |

OTHER PUBLICATIONS

Office Action dated Nov. 16, 2015, corresponding to Chinese Patent Application No. 201410256451.1.
Office Action in DE Application No. 102014108128.5, dated Feb. 17, 2016.
Office Action in CN Application No. 201410256451.1, dated May 23, 2016.

\* cited by examiner

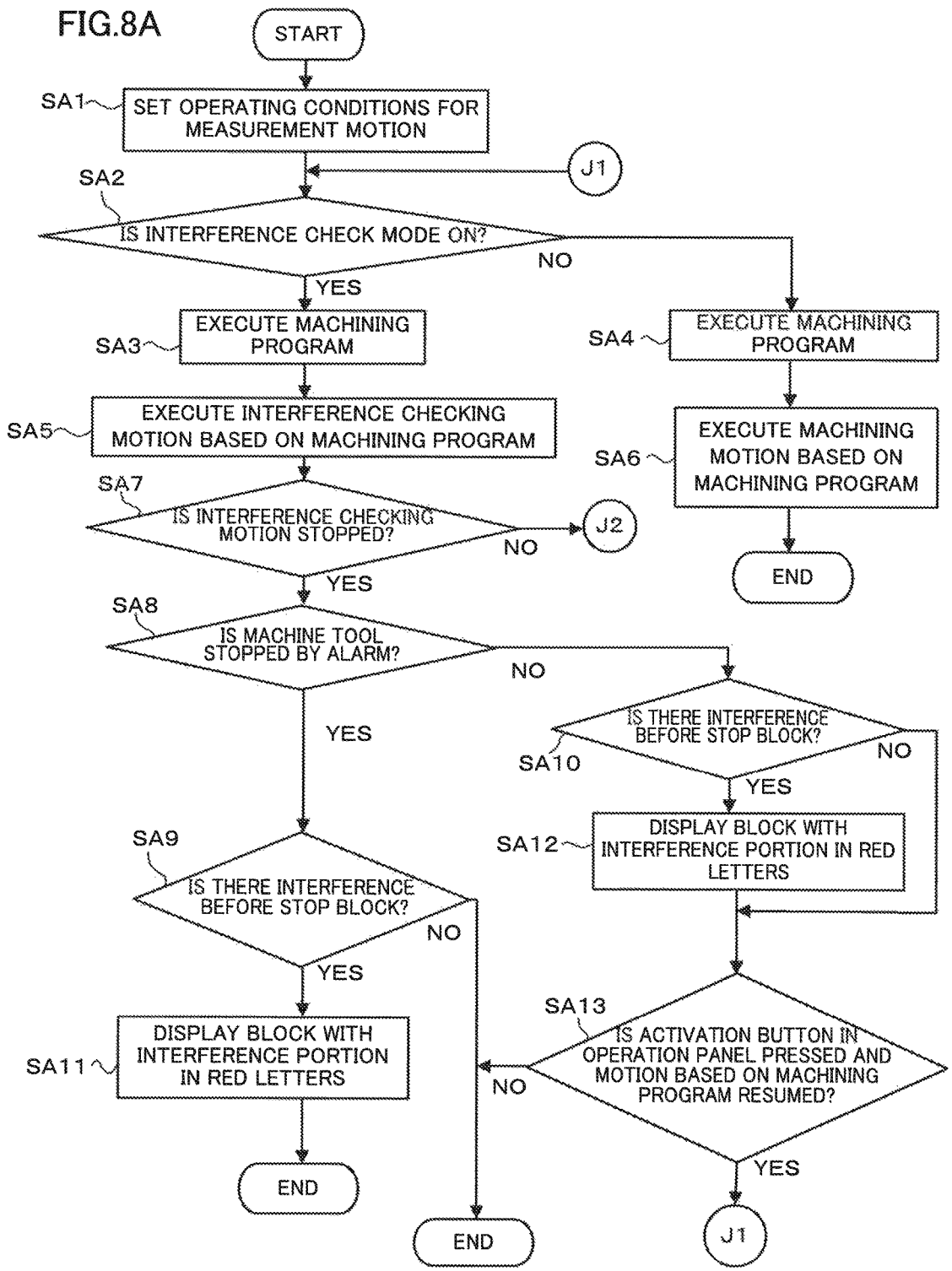

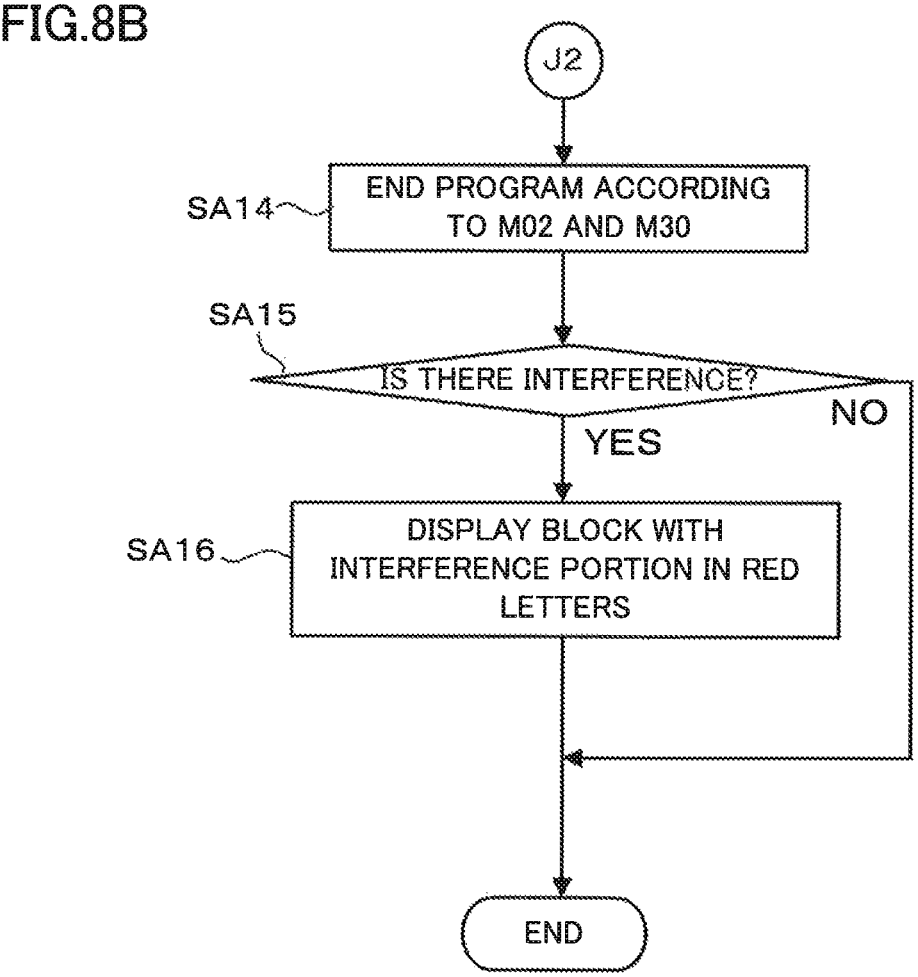

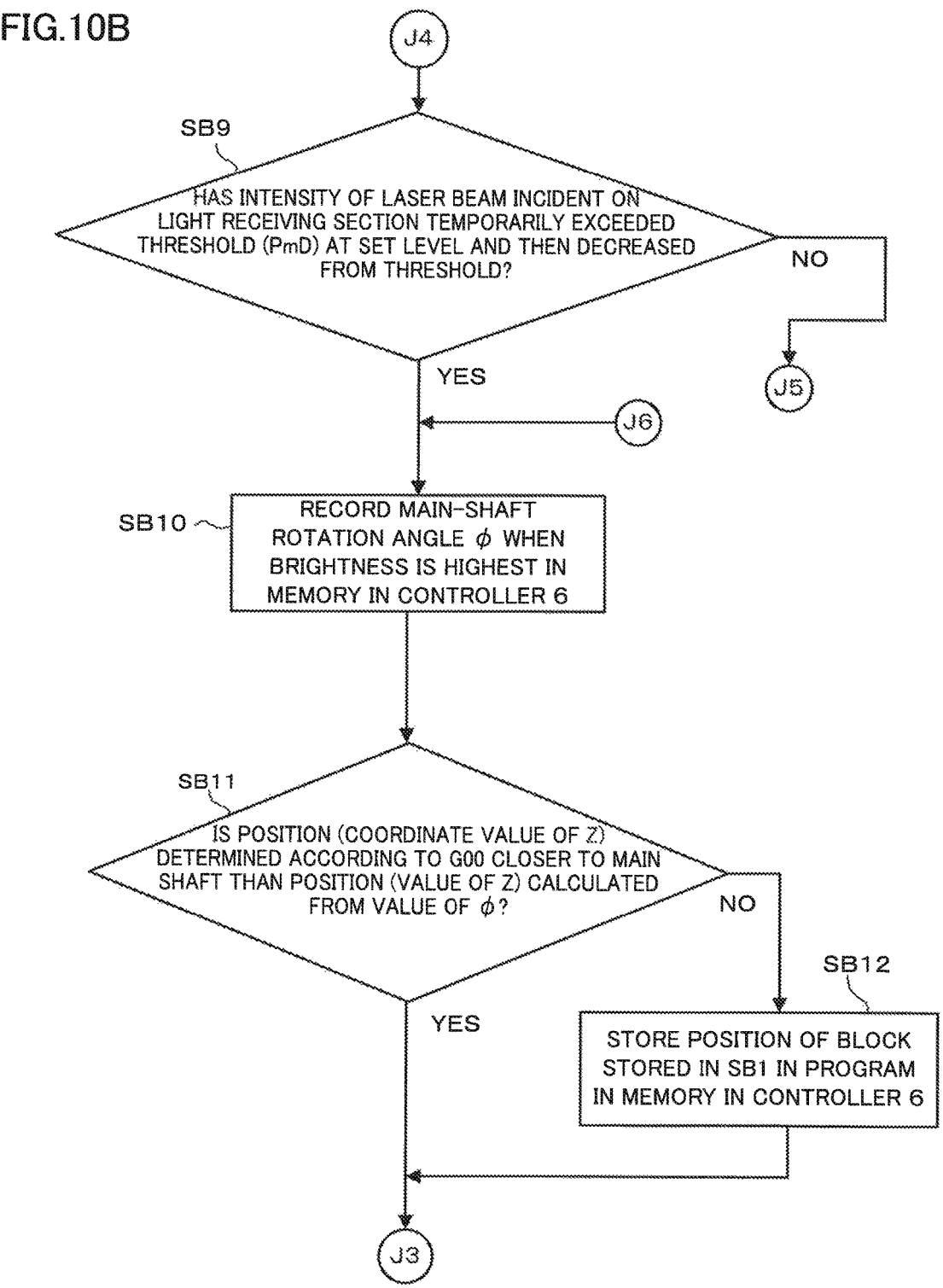

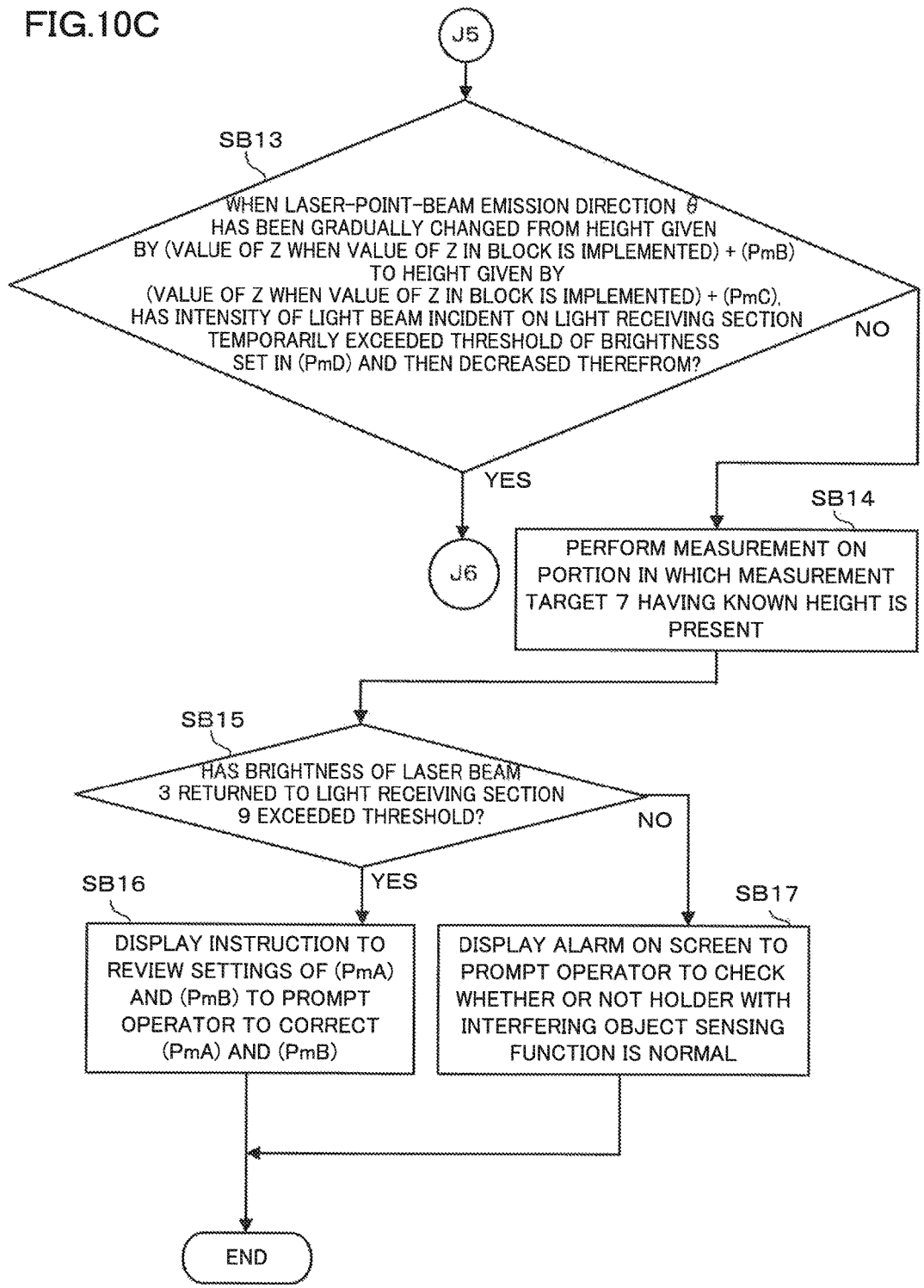

DISTANCE MEASUREMENT HOLDER AND MACHINE TOOL HAVING INTERFERING OBJECT SENSING FUNCTION

RELATED APPLICATIONS

The present application claims priority to Japanese Application Number 2013-122467, filed Jun. 11, 2013, the disclosure of which is hereby incorporated by reference herein in its entirety.

BACKGROUND OF THE INVENTION

1. Field of the Invention

The present invention relates to a distance measurement holder and a machine tool having an interfering object sensing function.

2. Description of the Related Art

Conventionally, to prevent mutual interferences between a main shaft, a cutting tool, a workpiece, a jig, and the like resulting from a faulty operation or faulty judgment by a worker during a debugging operation for a machining program, a method has been devised which measures the positions or shapes of the workpiece and the jig in some way, compares information about the positions or shapes to the movement paths of the main shaft and the cutting tool to determine the presence or absence of an interference and stops a machining motion when it is determined that an interference occurs, thereby preventing the interference.

A measurement method has been devised which involves no motion of elements such as a jig, a workpiece, a main shaft, a cutting tool, a measurement device, and a measurement device control unit during an operation of measuring the positions or shapes to prevent mutual interferences between such elements. Another method has been devised which limits the motion of such elements to a range in which no interference occurs. A non-contact method has also been devised which includes the line scanning of the interior of a working area with a laser beam, the use of information obtained through the image processing of an image on a table photographed with a camera, and the like (Japanese Patent Application Laid-Open No. 2009-265023).

However, the technique described above needs an extra device for controlling the emission direction of the laser beam or an extra processing unit for image data. This causes a problem in ensuring a space in which such devices are to be placed or the problem of a higher failure rate resulting from an increased number of parts.

SUMMARY OF THE INVENTION

It is therefore an object of the present invention to provide a distance measurement holder and a machine tool including the distance measurement holder and having an interference sensing function, in which the holder is attached to a main shaft to emit a laser beam, the emission direction of the laser beam is controlled by rotating the main shaft to suppress an increase in the number of parts, and image data need not be processed.

A distance measurement holder according to the present invention is for being attached to a main shaft of a machine tool to measure a distance from the main shaft to a measurement target and includes a holder main body, a laser emission device fixed to the holder main body to emit a laser beam, a tapered sleeve supported to be rotatable relative to the holder main body and fit into the main shaft, a reflection mirror section coupled to the tapered sleeve to reflect the laser beam emitted from the laser emission device, a light receiving section fixed to the holder main body to sense the laser beam reflected by the measurement target, and a positioning pin provided in the holder main body to be inserted into the machine tool. The reflection mirror section is shaped such that an angle of a side surface of the reflection mirror section changes according to a rotation angle of the main shaft.

In the distance measurement holder according to the present invention, measurement equipment has a simple structure to allow a reduction in the number of parts. Accordingly, it is possible to keep the failure rate of the measurement equipment low. In addition, with regard to data used to sense an interfering object, whether or not the reflected beam is incident on a light receptor can be used as a trigger for distance calculation to allow construction of a system which performs processing at a high speed without image processing.

A machine tool according to the present invention has a function of sensing an interfering object when machining is performed by the machine tool and includes a laser emission device attached to a main shaft to emit a laser beam, a tapered sleeve supported to be rotatable relative to a holder main body and fit into the main shaft, a reflection mirror section coupled to the tapered sleeve to reflect the laser beam emitted from the laser emission device, a light receiving section fixed to the holder main body to sense the laser beam reflected by a measurement target, a positioning pin provided in the holder main body to be inserted into the machine tool, a distance measurement holder having a shape which changes an angle of a side surface of the reflection mirror section according to a rotation angle of the main shaft, a storage unit that stores therein a value of a tangent of an emission angle of the laser beam corresponding to the rotation angle of the main shaft at a predetermined position in a vertical axis direction thereof, a machining program analysis unit that analyzes a block in a machining program to determine whether or not there is a block including an instruction to move the main shaft in the vertical axis direction thereof, a main-shaft rotation angle calculation unit that calculates, when determination is made by the analysis unit that there is an instruction to move the main shaft in the vertical direction thereof, the rotation angle of the main shaft from the value stored in the storage unit and a position to which the main shaft is instructed to move, so as to apply to the measurement target the laser beam corresponding to the position of the main shaft in accordance with the movement instruction, a light reception determining unit that applies the laser beam at a predetermined rotation angle including the calculated rotation angle of the main shaft to determine whether or not the light receiving section has received the reflected laser beam, a distance calculation unit that calculates a distance from a machine origin to the measurement target from the rotation angle of the main shaft when determination is made that the light receiving section has received the laser beam and from the value stored in the storage unit, and an interference determination unit that determines, from the calculated distance, whether or not the measurement target and the machine tool interfere with each other.

The machine tool having the function of sensing an interfering object when machining is performed therewith can reduce the calculation time for producing a program for an interference checking motion and prevent the time required for the entire interference checking operation from increasing.

According to the present invention, a distance measurement holder and a machine tool including the distance measurement holder and having the interference sensing function can be provided in which the holder is attached to the main shaft to emit the laser beam, the emission direction of the laser beam is controlled by rotating the main shaft to suppress an increase in the number of parts, and image data need not be processed.

BRIEF DESCRIPTION OF THE DRAWINGS

The above and other objects and features of the present invention will become apparent from the following description of an embodiment given with reference to the accompanying drawings, of which:

FIGS. 8A and 8B are flow charts illustrating the flow of a process performed by the distance measurement holder until a collision is prevented;

FIGS. 10A to 10C are flow charts illustrating the flow of a process performed in the execution of an interference checking motion for a machining program which is executed in Step SA5 in the flow chart of FIG. 8A.

DESCRIPTION OF THE PREFERRED EMBODIMENTS

A structure of an embodiment of a distance measurement holder according to the present invention will be described with reference to FIGS. 1 to 3.

Figure 1:
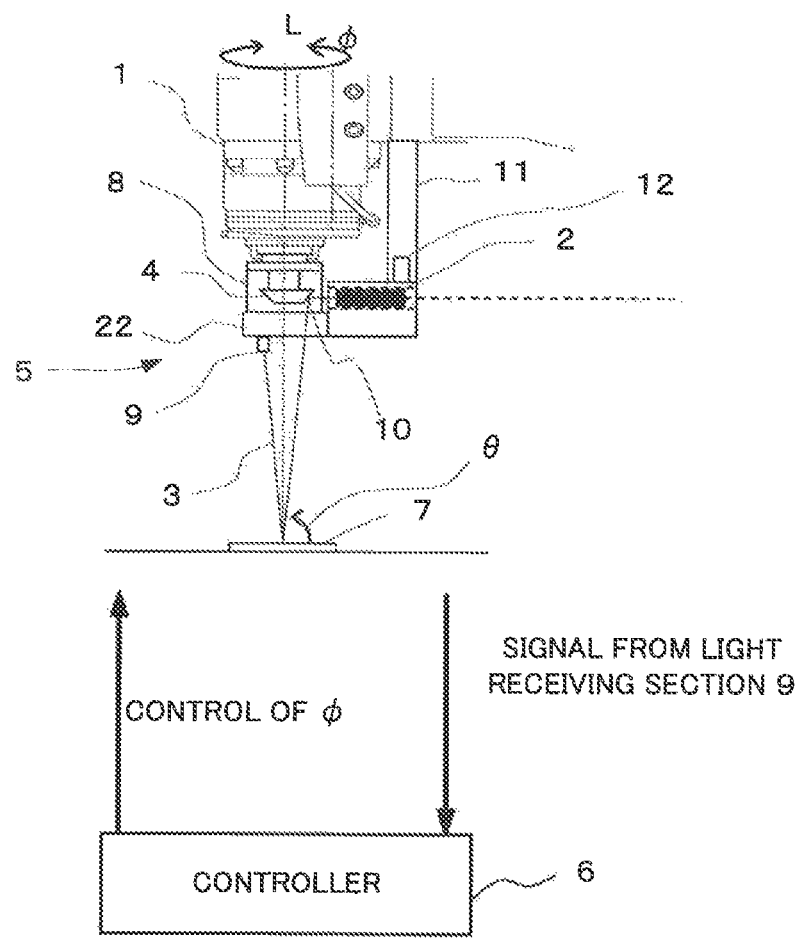
FIG. 1 is a view illustrating a structure of an embodiment of a distance measurement holder according to the present invention.

In a machine tool in which a main-shaft rotation angle $\phi$ around a rotation axis L of a main shaft 1 can be controlled, a distance measurement holder 5 is attached to the main shaft 1 to be used, as shown in FIG. 1.

The distance measurement holder 5 has a reflection mirror section 4 which relates an emission angle $\theta$ of a laser beam 3 emitted from a laser emission device 2 to the main-shaft rotation angle $\phi$ as a function thereof, i.e., tan $\theta$=f($\phi$). The distance measurement holder 5 includes a holder non-rotating section 8 and the reflection mirror section 4. The laser emission device 2 is attached to the holder main body (holder non-rotating section 8).

The main-shaft rotation angle $\phi$ is controlled by a controller 6 in the machine tool to be gradually changed. The controller 6 in the machine tool references the main-shaft rotation angle $\phi$ when the brightness of the laser beam reflected by a measurement target 7, which could be an interfering object such as a workpiece or a jig, and returned to a light receiving section 9 attached to a base 22 of the holder non-rotating section 8 is highest to determine the value of the emission angle $\theta$. Note that a configuration of the base 22 will be described later using FIG. 7.

The positional relationship between a laser-point-beam emission position 10 and the light receiving section 9 relative to the rotation axis L is determined from the above emission angle $\theta$, and using geometrical conditions, the distance between the main shaft 1 and the measurement target 7 in a direction parallel to the rotation axis L is measured. When it is determined that a jig, a workpiece, a main shaft, and a cutting tool interface with each other in the range of a rapid positioning motion specified in an NC program, the user is prompted to correct an interference portion in the NC program to prevent a collision therebetween.

Note that, similarly to a conventional counterpart, the controller 6 in the mechanical tool has the function of analyzing and executing a machining program and includes a storage unit storing therein the machining program and the like, an input unit for inputting various data to the controller 6, and a display unit which performs various types of display.

Figure 2:
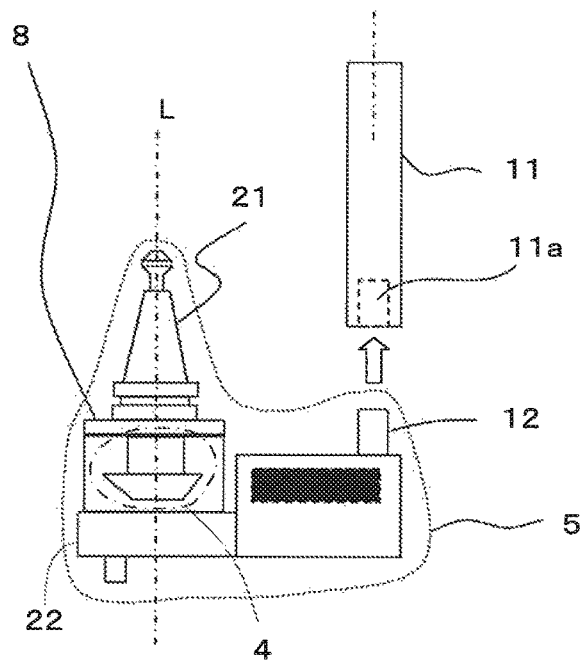
FIG. 2 is a view illustrating the motion of the distance measurement holder of FIG. 1 which is about to be held in a main shaft in gripped relation.
Figure 3:
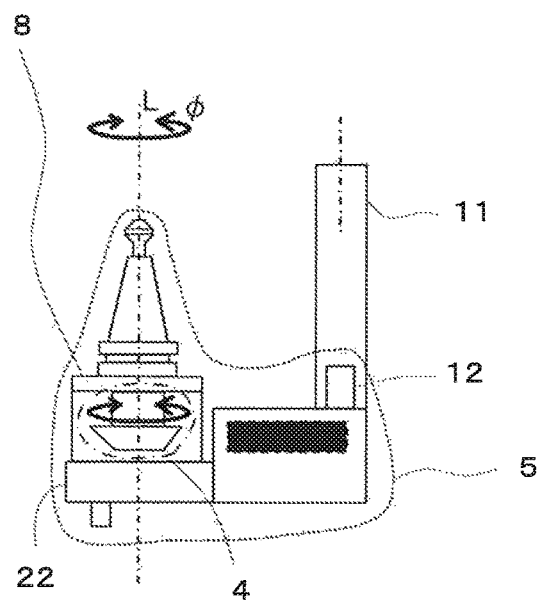
FIG. 3 is a view illustrating a state in which the distance measurement holder of FIG. 1 is held in the main shaft in gripped relation.

When the distance measurement holder 5 is to be held in the main shaft 1 in gripped relation, a whirl-stop pin (positioning pin) 12 attached to the holder non-rotating section 8 is fit, as shown in FIGS. 2 and 3, into a pin hole or groove (generally referred to as a hole 11a) provided in a whirl-stop block 11 mounted behind the main shaft 1. At this time, the tapered sleeve 21 is fit into the main shaft 1 to be held therein in gripped relation. The tapered sleeve 21 and the reflection mirror section 4 are supported by the holder non-rotating section 8 in a state where the tapered sleeve 21 and the reflection mirror section 4 are rotatable around the rotation axis L relative to the holder non-rotating section 8. The tapered sleeve 21 and the reflection mirror section 4 are connected by mechanical coupling so as to rotate in phase around the rotation axis L. Consequently, when the main-shaft rotation angle $\phi$ is varied by the controller 6 in the machine tool, the holder non-rotating section 8 does not rotate around the rotation axis L, but the reflection mirror section 4 and the tapered sleeve 21 rotate around the rotation axis L.

Next, the principle of distance measurement using the distance measurement holder of FIG. 1 will be described with reference to FIGS. 4 and 5.

Figure 4:
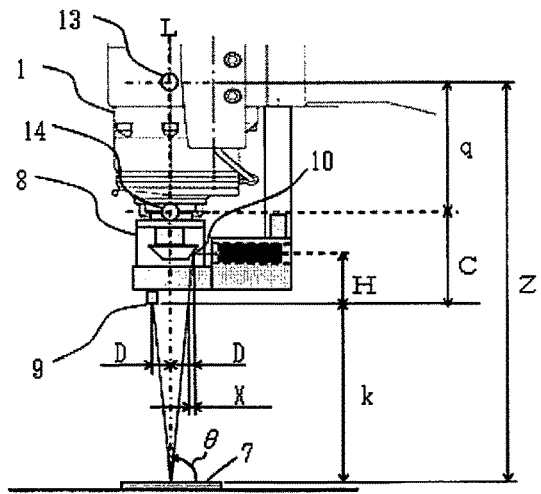
FIG. 4 is a view illustrating the principle of calculation of a distance k from a light receiving section in the distance measurement holder of FIG. 1 to a measurement target.

As shown in FIG. 4, it is assumed that D is the distance from the rotation axis L to the light receiving section 9 in a direction perpendicular to the rotation axis L, X is the difference between D described above and the distance from the rotation axis L to the laser-point-beam emission position 10 in the direction perpendicular to the rotation axis L, and H is the distance between the light receiving section 9 and the laser-point-beam emission position 10 in a direction parallel to the rotation axis L. It is also assumed that k is the distance between the light receiving section 9 and the measurement target 7 in the direction parallel to the rotation axis L when the laser beam 3 is emitted to the measurement target 7 in a state where the upper surface thereof is orthogonal to the rotation axis L, the emission angle $\theta$ is gradually changed, and the brightness of the laser beam 3 returned to the light receiving section 9 is highest. The distance k is calculated in accordance with the following numeral expression (1):

$$k = H \cdot D / X \qquad (1).$$

When the distance k is obtained in accordance with the numerical expression (1), it is assumed that q is the distance between a tool coordinate origin 13 in the machine tool and a position control point 14 in the main shaft 1 controlled by the controller 6 in the machine tool in the direction parallel to the rotation axis L, C is the distance between the position control point 14 in the main shaft 1 and the light receiving section 9 in the direction parallel to the rotation axis L, and Z is the distance between the tool coordinate origin 13 in the machine tool and the measurement target 7 in the direction parallel to the rotation axis L. The distance Z is calculated in accordance with the following numerical expression (2):

$$Z=k+C+q \qquad (2).$$

Figure 5:
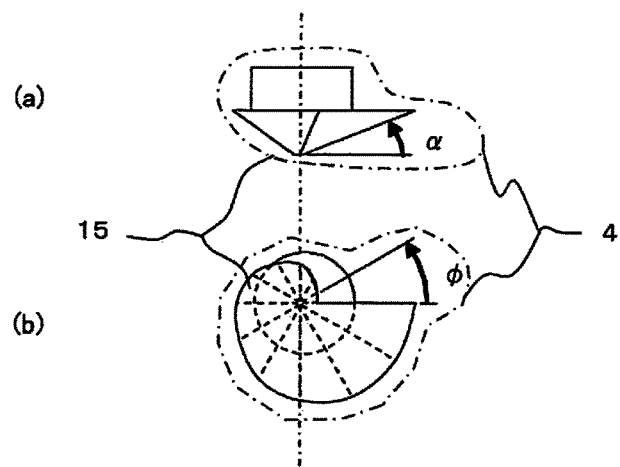
FIG. 5 is a detailed illustrative view of a reflection mirror section in the distance measurement holder of FIG. 1.

As shown in the front view (a) and the bottom view (b) in FIG. 5, the reflection mirror section 4 has a reflection surface 15 which is a curved surface capable of reflecting the laser beam 3. The reflection surface 15 is configured such that, when the reflection mirror section 4 is viewed from the direction perpendicular to the rotation axis L, an inclination a of the surface relative to the rotation axis L changes in a circumferential direction. By controlling the main-shaft rotation angle φ, it is possible to control the emission direction θ of the laser beam and the relationship between the main-shaft rotation angle φ and the emission direction θ of the laser beam is given by tan θ=f(φ). From the following numerical expression (3), the following numerical expression (4) can be obtained:

$$H/X=\tan\theta \qquad (3); \text{ and}$$

$$H/X=\tan\theta=f(\phi) \qquad (4).$$

Accordingly, from the foregoing numerical expressions (1) to (4), the distance Z between the tool coordinate origin 13 in the machine tool and the measurement target 7 in the direction parallel to the rotation axis L can be obtained in accordance with the following numerical expression (5):

$$Z=k+C+q=H\cdot D/X+C+q=f(\phi)\cdot D+C+q \qquad (5).$$

On the right side of the foregoing numerical expression (5), q is known by the controller 6 in the machine tool. Also, by calibrating the value of D, the value of C, and f(φ) before the interference sensing motion is performed, the value of Z can be obtained from the main-shaft rotation angle φ using the numerical expression (5).

Figure 6A:
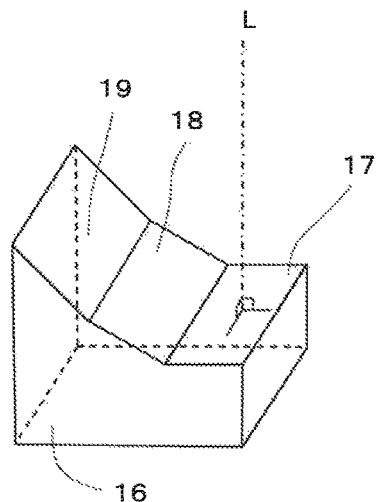
FIGS. 6A to 6C are views illustrating a calibrator for calibrating the value D, the value of C, and H/X (=f($\phi$)) in FIG. 4.
Figure 6B:
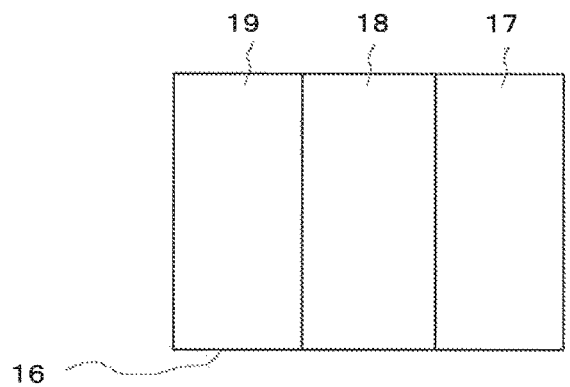
Figure 6C:
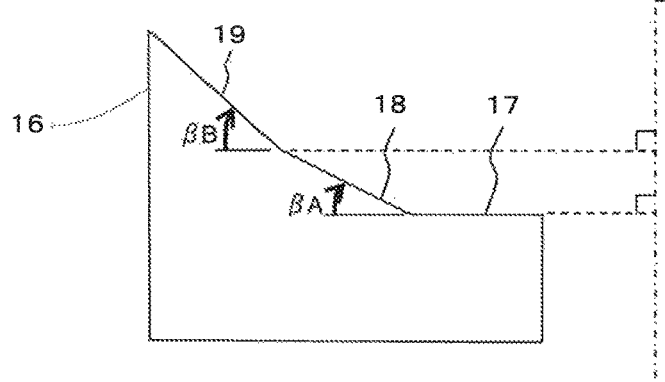

Next, a description will be given of the calibration of the value of D, the value of C, and f(φ) using a calibrator with reference to FIGS. 6A to 6C. FIGS. 6B and 6C are a top view and a side view of the calibrator of FIG. 6A (perspective view).

A calibrator 16 includes a surface 17 orthogonal to the rotation axis L, an inclined surface 18 (first inclined surface), and an inclined surface 19 (second inclination surface). An inclination angle βA of the inclined surface 18 and an inclination angle βB of the inclined surface 19 each relative to the surface 17 are known. The calibrator 16 is placed in a working region in the machine tool and performs a predetermined calibrating motion to calibrate D, C, and f(φ).

In a state where the main-shaft rotation angle φ is set at a given rotation angle φ1, the value of q is gradually changed while a state where the laser beam 3 is incident on the inclined surface 18 (first inclined surface) is maintained. Here, it is assumed that k' is the distance from the light receiving section 9 to the inclined surface 18 in the direction parallel to the rotation axis L when the brightness of the laser beam 3 returned to the light receiving section 9 is highest.

Then, in a state where the main-shaft rotation angle φ is similarly set at φ1, the value of q is gradually changed while a state where the laser beam 3 is incident on the inclined surface 19 (second inclined surface) is maintained. Here, it is assumed that k" is the distance from the light receiving section 9 to the inclined surface 19 in the direction parallel to the rotation axis L when the brightness of the laser beam 3 returned to the light receiving section 9 is highest.

When it is assumed that p=(k'−k)/(k"−k), A=tan(2·βA), and B=tan(2·βB) are satisfied, f(φ1) when the main-shaft rotation angle φ is φ1 is calculated in accordance with the following numerical expression (6):

$$f(\phi 1)=(A-p\cdot B)/\{A\cdot B\cdot(p-1)\} \qquad (6).$$

In the foregoing numerical expression (6), the values of A and B are known from the size and shape of the calibrator 16 and p is a known value since p can be obtained from the value of q from the controller 6 in the machine tool.

Using the value of f(φ1) obtained herein, the value of D is calculated in accordance with a numerical expression (7):

$$D=(k'-k)/[\tan\{\theta(\phi 1)-2\cdot\beta A\}-\tan\{\theta(\phi 1)\}] \qquad (7).$$

In the foregoing numerical expression (7), βA is known from the size and shape of the calibrator 16 and (k'−k) has a known value since (k'−k) can be obtained from the value of q from the controller 6 in the machine tool. When the denomination is decomposed in accordance with a tangent additive theorem, the value of tan {θ(φ1)}=f(φ1) is also known. From the value of D obtained herein and the value of f(φ1), the value of C is calculated in accordance with the following numerical expression (8):

$$C=Z-D\cdot f(\phi 1) \qquad (8).$$

In the foregoing numerical expression (8), the value of Z can be obtained by measuring the distance between the surface 17 of the calibrator 16 orthogonal to the rotation axis L and the tool coordinate origin 13 in the machine tool in the direction parallel to the rotation axis L by a known method.

By maintaining a state where the laser beam 3 is applied to the surface of the calibrator 16 orthogonal to the rotation axis L and recording, in the controller 6 in the machine tool, the main-shaft rotation angle φ when the light beam returned to the light receiving section 9 is intensest in the range of the value of q determined from the range in which the sensing of an interfering object is intended to be performed, the function f(φ1) can be calibrated. The value of f(φ1) at a given main-shaft rotation angle φ is calculated in accordance with the following numerical expression (9):

$$f(\phi 1)=(Z-C)/D \qquad (9).$$

Next, the outline of a distance-measurement-holder detection unit, an interfering object sensing method using the same, and a method of notifying an operator of the presence of an interfering object will be described with reference to FIG. 7.

Figure 7:
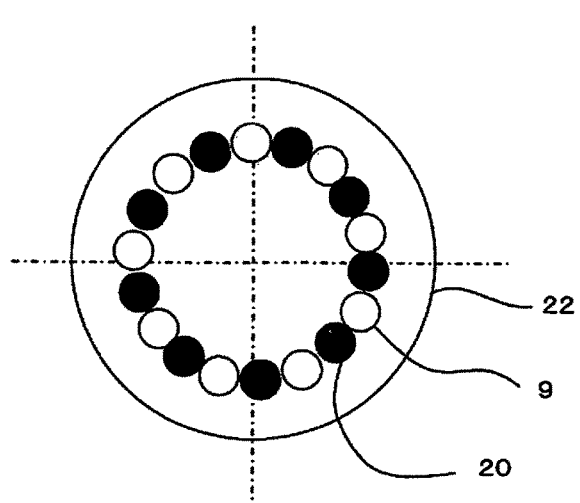
FIG. 7 is a view obtained by viewing the base portion of the distance measurement holder 5 of FIG. 1 from below.

FIG. 7 is a view obtained by viewing the base 22 of the distance measurement holder 5 from below. When the light receiving section 9 and the laser-point-beam emission position 10 are assumed to form one measurement element set, a plurality of the measurement element sets are equispacedly arranged on a circle around the rotation axis L. The light receiving section 9 and a position (laser-beam passage position 20) at which the laser beam 3 passes through the base 22 are point-symmetrical to each other. The laser-beam passage position 20 in the base 22 corresponds to a through hole. The laser beam emitted from the laser emission device 2 and branched is incident on the reflection mirror section 4.

The laser beam is reflected by the reflection mirror section 4 and passes through the through hole (laser-beam passage position 20) to irradiate the measurement target 7.

In each of the measurement element sets, when an error of the calculated value of Z is in a prescribed range, the value of Z obtained at this time is compared to that in the machining program. As a result of the comparison, when it is determined that an interference occurs, the worker is prompted to correct the machining program to avoid the interference, thereby preventing the interference.

When a measurement is performed on an inclined surface as a surface of a workpiece, information about the inclined surface is set using a dedicated screen prior to a measurement motion. During the measurement, using the one of the plurality of measurement element sets which emits the laser beam 3 in a direction closest to a most steeply inclined direction (i.e., the normal direction of the inclined surface), the measurement is performed in consideration of the inclination angle. Then, the distance to the measurement target obtained by the measurement is compared to that in the machining program. As a result, when it is determined that an interference occurs, the worker is prompted to correct the machining program to avoid the interference, thereby preventing the interference.

Next, a description will be given of items which need to be set before an interference sensing motion using the distance measurement holder is performed.

First, the flow of a process performed by the distance measurement holder until a collision is prevented will be described using the flow charts of FIGS. 8A and 8B.

Using a holder with an interference sensing function (distance measurement holder 5), operating conditions related to a measurement motion and needed to check an interference in the machining program are set (Step SA1).

Figure 9:
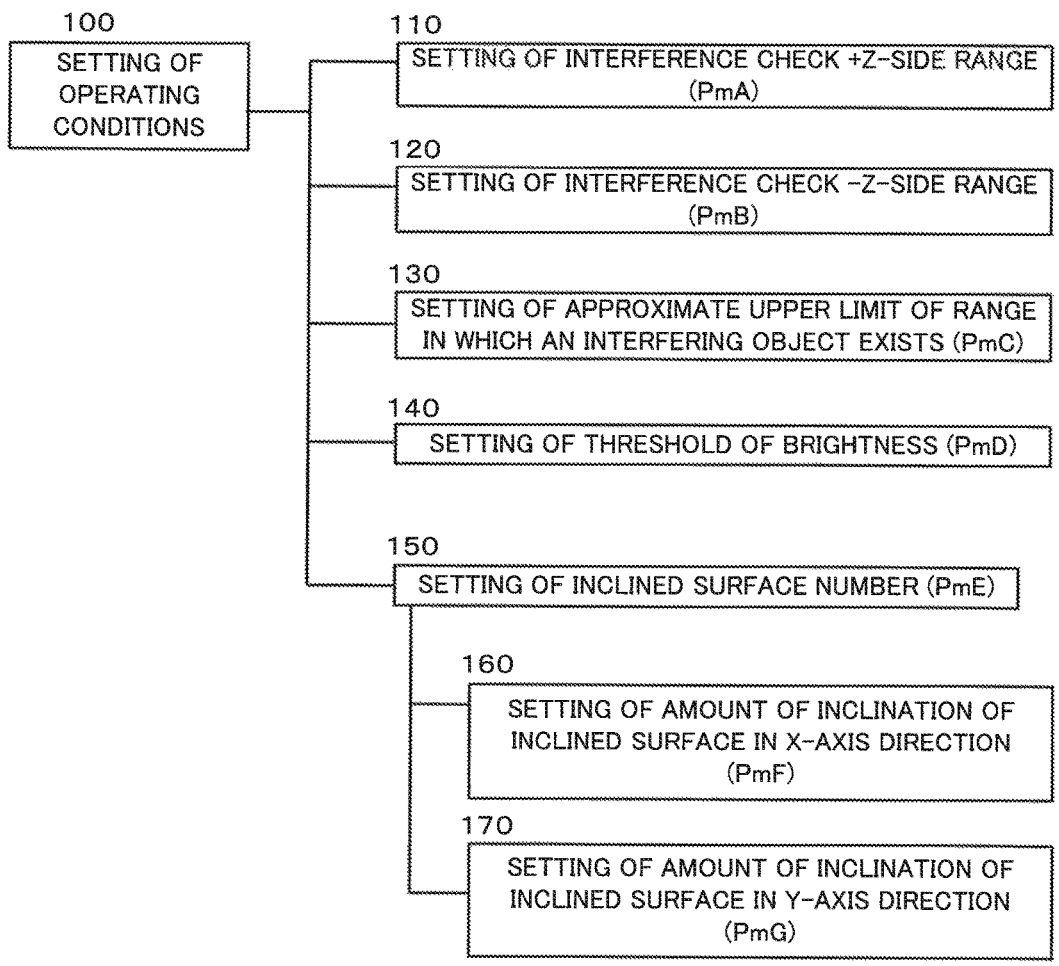
FIG. 9 is a view illustrating the set items of operating conditions which are set in Step SA1 in the flow chart of FIG. 8A.

As shown in FIG. 9, "Setting of operating conditions" (100) includes "Setting of interference check +Z-side range (PmA)" (110), "Setting of interference check −Z-side range (PmB)" (120), "Setting of approximate upper limit of range in which an interfering object exists (PmC)" (130), "Setting of threshold of brightness (PmD)" (140), "Setting of inclined surface number (PmE)" (150), "Setting of amount of inclination of inclined surface in X-axis direction (PmF)" (160), and "Setting of amount of inclination of inclined surface in Y-axis direction (PmG)" (170).

As the value of "interference check +Z-side range (PmA)" mentioned above, a value determined through experience, calculation, and the like on the basis of the degree of variations in the shape of a workpiece raw material and the range of workpiece/jig placement errors is set.

As the value of "interference check −Z-side range (PmB)" mentioned above, a value determined through experience, calculation, and the like on the basis of the degree of variations in the shape of a workpiece raw material, the range of workpiece/jig placement errors, and an approximate distance between a determined position and the workpiece when the main shaft moves in the −Z-direction according to G00 is set.

The value of "approximate upper limit of range in which an interfering object exists (PmC)" mentioned above is assumed to be set on the basis of the position of an interfering object assumed to be closest to the main shaft in the direction parallel to L in the range in which the measurement target 7 exists.

The value of "threshold of brightness (PmD)" mentioned above is set on the basis of to what degree the measurement target 7 reflects the laser beam depending on the material or surface quality thereof using a switch such as a dial provided in the main body portion of the holder with the interference sensing function (distance measurement holder 5).

The value of "inclined surface number (PmE)" mentioned above is assumed to be set to identify the plurality of inclined surfaces when a measurement is performed on the inclined surfaces.

As the value of "amount of inclination of inclined surface in X-axis direction (PmF)" mentioned above, a value obtained by determining how much the surface with the set inclined surface number (PmE) mentioned above is inclined relative to the X-axis direction by actual measurement based on experience or calculation or using a known method is set.

As the value of "amount of inclination of inclined surface in Y-axis direction (PmG)" mentioned above, a value obtained by determining how much the surface with the set inclined surface number (PmE) mentioned above is inclined relative to the Y-axis direction by actual measurement based on experience or calculation or using a known method is set.

In the screen of the controller 6, the ON/OFF state of an interference check mode is switched by a manual operation (Step SA2).

Next, the flow of a processing in an interference sensing motion using the distance measurement holder will be described.

When a machining program is executed in a state where the interference check mode is OFF (when the result of the determination in Step SA2 is NO) (Step SA4), interference checking is not performed and a machining motion is performed following the instruction given by the machining program (Step SA6).

When the machining program is executed in a state where the interference check mode is ON (when the result of the determination in Step SA2 is YES) (Step SA3), an interference checking motion is performed on the executed machining program (Step SA5).

When the interference checking motion is not stopped (when the result of the determination in Step SA7 is NO) and the machining program has normally ended as a result of code processing according to M02 (end-of-program instruction), M30 (end-of-tape instruction), or the like (Step SA14), whether or not an interference is detected in Step SA5 is determined by referencing/checking the memory in the controller 6 (Step SA15). At this time, the information in the memory to be referenced includes information about the length of the tool. When there is an interference, a block with an interference portion is displayed in red letters (Step SA16) to prompt the operator to edit the program.

When there is no record of an interference in Step SA15 described above, the process is immediately ended.

When the interference checking motion is stopped in Step SA7, it is determined whether or not the cause of the stop is an alarm (Step SA8). When the machine tool is stopped by an alarm (when the result of the determination in Step SA8 is YES), it is determined whether or not an interference is detected in Step SA5 described above by referencing/checking the memory in the controller 6 (Step SA9). When there is an interference (when the result of the determination in Step SA9 is YES), a block with an interference portion is displayed in red letters (Step SA11).

In Step SA8 described above, when the machine tool is not stopped by an alarm (when the result of the determination in Step SA8 is NO), it is determined whether or not an interference is detected by the processing in Step SA5 described above before a stop block. As a result, when an interference is detected (when the result of the determination in Step SA10 is YES), the block with the interference portion is displayed in red letters (Step SA12) to provide a state where the movement of the shaft is stopped.

When no interference is detected in Step SA10 described above (when the result of the determination in Step SA10 is NO), the state where the movement of the shaft is stopped is provided.

After the processing in Steps SA10 and SA12 described above, when the state where the movement of the shaft is stopped is provided, it is determined whether or not an activation button in an operation panel is pressed and the movement based on the machining program is resumed (Step SA13). When the movement based on the machining program is resumed (when the result of the determination in Step SA13 is YES), the current process returns to Step SA2.

In Step SA13 described above, when the activation button in the operation panel is not pressed (when the result of the determination in Step SA10 is NO), the processing is ended.

Figure 10A:
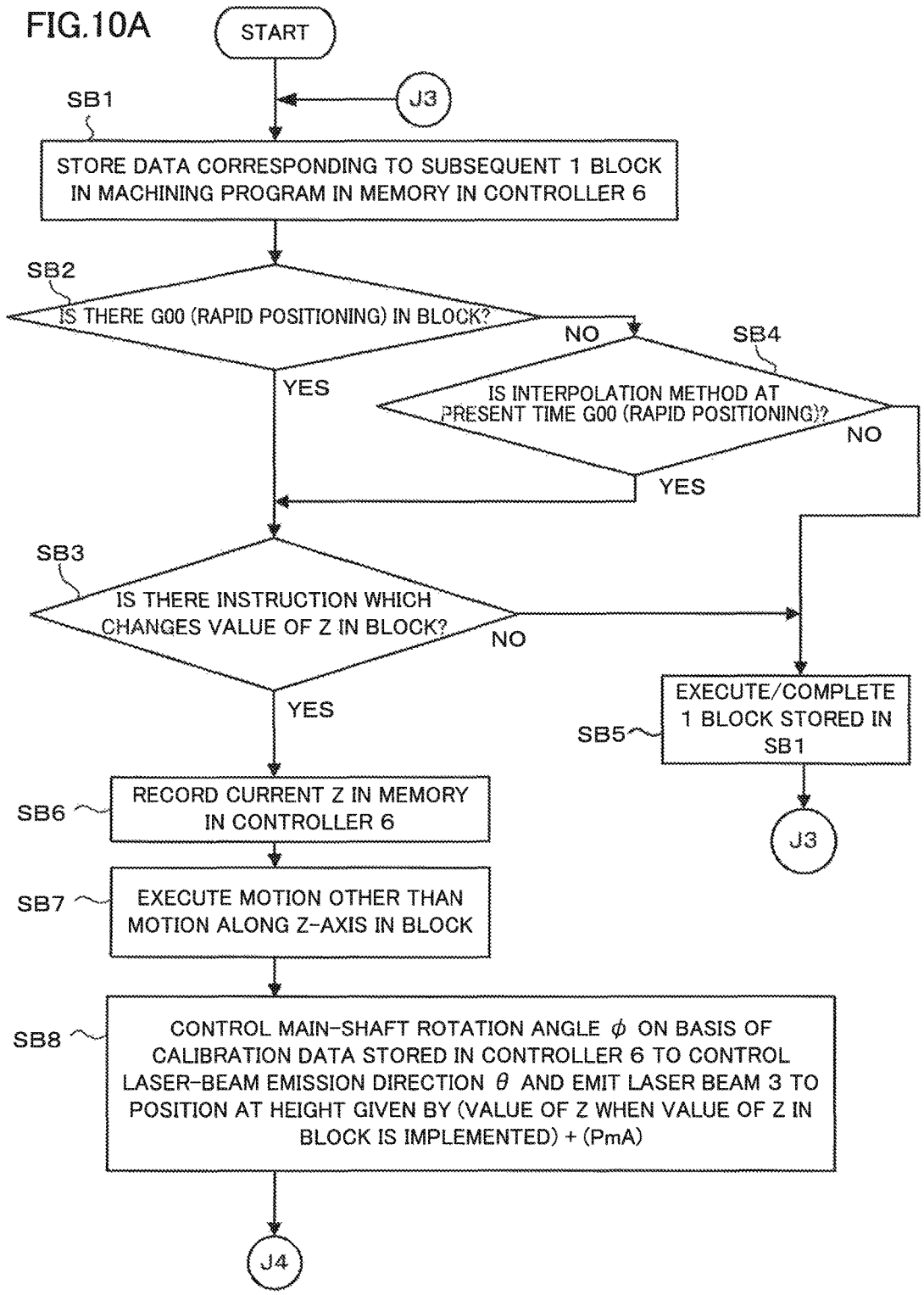

Next, the details of the execution of the interference checking motion (Step SA5 described above) in the flow of the processing in the interfering object sensing motion using the distance measurement holder and internal processing will be described using FIGS. 10A to 10C.

Data corresponding to the subsequent one block in the machining program is stored in the memory in the controller 6 in the machine tool (Step SB1). In the block stored in Step SB1 described above, when a motion which changes the value of Z in FIG. 4 is performed according to G00 (when the result of the determination in Step SB2 is YES), it is checked first whether or not there is an instruction which changes the value of Z in the block stored in Step SB1 described above (Step SB3).

When movement is not performed according to G00 (when the result of the determination in Step SB2 is NO and the result of the determination in Step SB4 is NO), after the one block stored in Step SB1 is executed and completed (Step SB5), the current process moves to processing in Step SB1 where data corresponding to the subsequent one block is read into the controller 6 in the machine tool. When there is the instruction which changes the value of Z in Step SB3 described above (when the result of the determination in Step SB3 is YES), the current value of Z (see FIG. 4) is recorded in the memory in the controller 6 in the machine tool (Step SB6). Then, in the block stored in Step SB1 described above, a motion other than a motion along a Z-axis is executed and completed (Step SB7).

On the basis of the calibration data recorded in the controller 6, the main-shaft rotation angle φ is controlled to control the laser-beam emission direction θ. The laser-beam emission direction θ is gradually changed from a position closer to the main shaft 1 in the direction parallel to the rotation axis L than a position to be determined on the basis of the value of Z according to G00 when a motion which changes the value of Z is actually performed by the distance resulting from the setting of "Interference check +Z-side range PmA" to a position more distant from the main shaft 1 in the direction parallel to the rotation axis L than the position to be determined on the basis of the value of Z according to G00 when a motion which changes the value of Z is actually performed by the distance resulting from the setting of "Interference check −Z-side range PmB" (Step SB8).

When the brightness of the laser point beam (laser beam 3) returned to the light receiving section 9 temporarily exceeds the threshold of brightness set in (PmD) and then decreases from the threshold (Step SB9), it is determined that the measurement elements are normally operating and φ at the time when the brightness is highest is recorded in the memory in the controller 6 (Step SB10).

The value of Z calculated from the value of the main-shaft rotation angle φ recorded in the foregoing controller 6 is compared to a coordinate value which determines the position of the main shaft 1 according to G00. When the position (coordinate value of Z) determined according to G00 is closer to the main shaft 1 than the position (value of Z) calculated from the value of φ in the direction parallel to the rotation axis L, it is determined that there is no interference (when the result of the determination in Step SB11 is YES) and the current process returns to Step SB1. On the other hand, when the value of Z calculated from the value of the main-shaft rotation angle φ is compared to the coordinate value which determines the position of the main shaft 1 according to G00 and when the position (value of Z) calculated from the value of φ is closer to the main shaft 1 than the position (coordinate value of Z) determined according to G00 in the direction parallel to the rotation axis L, it is determined that an interference occurs (the result of the determination in Step SB11 is NO) and the position of a block which causes an interference in the program is recorded in the memory in the controller 6 in the machine tool (Step SB12).

When the laser-beam emission direction θ is gradually changed in accordance with the set values of (PmA) and (PmB), if the laser beam 3 is not returned to the measurement elements, it is determined that the holder with the interference sensing function (distance measurement holder 5) is broken or the height of the measurement target 7 is outside a scanning range. Then, the laser-point-beam emission direction θ is gradually changed from the position obtained by adding PmB to the value of Z in the block stored in Step SB1 with which the position is determined to the position obtained by adding PmC to the value of Z in the block stored in Step SB1 with which the position is determined, in the direction parallel to the rotation axis L while approaching the main shaft 1 (Step SB13). In the process, when the intensity of the light beam incident on the light receiving section temporarily exceeds the set threshold (PmD) of brightness and then decreases therefrom (when the result of the determination in Step SB13 is YES), it is determined that an interference occurs and the current process moves to Step SB10 described above where the position of the block which causes an interference in the program is recorded.

When the brightness of the laser beam 3 sensed in the light receiving section 9 does not exceed the threshold in Step SB13 described above, a measurement is performed on a portion in which the measurement target 7 having a known height is present (Step SB14). As a result of the measurement, when the brightness of the laser beam 3 returned to the light receiving section 9 exceeds the threshold (when the result of the determination in Step SB15 is YES), it is determined that the distance measurement holder 5 is normally operating. An instruction to review the settings of (PmA) and (PmB) is displayed on the screen to prompt the operator to correct (PmA) and (PmB) (Step SB16), whereby the processing is ended.

On the other hand, when the brightness of the laser beam 3 returned to the light receiving section 9 does not exceed the threshold of the brightness set in (PmD) (when the result of the determination in Step SB15 is NO), it is determined that the holder with the interfering object sensing function (distance measurement holder 5) is not normally operating. An alarm is displayed on the screen to prompt the operator to check whether or not the distance measurement holder 5 is normal (Step SB17), whereby the processing is ended.

When a measurement is performed on an inclined surface, the number corresponding to (PmE) is clearly written in the program. When the number is written, the maximally inclined direction of the inclined surface is calculated using (PmF) and (PmG). The measurement is performed using the one of the plurality of the measurement element sets which emits the laser pointer beam (laser beam 3) in a direction closest to the maximally inclined direction when viewed in the direction of the rotation axis L in consideration of the amount of inclination. A sequence of the measurement motion uses the same sequence as used when a surface orthogonal to the rotation axis L is measured.

When the machining program is stopped, the row number of the block with an interference and a G-code are displayed on the screen to prompt the operator to correct the program.

As described above, in the present invention, attention is focused only on the code in the block to be subsequently processed in the machining program and it is determined whether or not there is a portion which changes the value of Z. When positioning using the value of Z is performed, the laser emission direction θ may be controlled appropriately to the position at which the main shaft is positioned. The control can be performed prior to measurement by referring to data configured using the calibrator and recorded in the memory in the controller in the machine tool and controlling the laser emission direction θ using the main shaft angle φ. Each of the motions related to Z in the machining program can be used as a program for checking an interference by merely being replaced with the control of the main shaft angle φ. As a result, it is possible to reduce the processing time for producing a program for an interference checking motion and reduce the time required for the entire interference checking motion.

Also according to the present invention, the measurement equipment has a simple structure and the number of parts can be reduced. Accordingly, the failure rate of the measurement equipment can be reduced to be lower than in a conventional method. The amount of data used in the system in the present invention is data amount that may allow only the determination to be made on whether or not the reflected light is incident on a light receptor to sense an interfering object. Consequently, in determining the presence or absence of an interfering object in the controller in the machine tool, the amount data to be transmitted is small and communication can be ended immediately. Therefore, processing can be performed at a high speed and, no matter whether a wired system or a wireless system is constructed, a system which performs processing at a high speed can be constructed.

What is claimed is:

1. A machine tool having a function of sensing an interfering object when machining is performed by the machine tool, the machine tool comprising:
   a main shaft;
   a laser emission device attached to the main shaft and configured to emit a laser beam;
   a tapered sleeve supported to be rotatable relative to a holder main body and configured to be fit into the main shaft when detachably attached to the main shaft;
   a reflection mirror section coupled to the tapered sleeve and configured to reflect the laser beam emitted from the laser emission device, wherein an angle of a side surface of the reflection mirror section changes in a circumferential direction around a rotation axis L of the main shaft;
   a light receiving section fixed to the holder main body and configured to sense the laser beam reflected by a measurement target;
   a positioning pin provided in the holder main body and configured to be inserted into the machine tool; and
   a controller configured to
      store therein a tangent value of an emission angle of the laser beam corresponding to a rotation angle of the main shaft at a predetermined position in a vertical axis direction thereof,
      analyze a block in a machining program to determine whether or not there is, in the block, an instruction to move the main shaft in the vertical axis direction thereof,
      when a determination is made that there is an instruction to move the main shaft in the vertical direction thereof with respect to the position of the main shaft, calculate the rotation angle of the main shaft from the value stored by the controller and a position to which the main shaft is instructed to move, for applying the laser beam to a position to which a position control point of the main shaft is expected to come when the main shaft actually moves,
      apply the laser beam at a predetermined rotation angle including the calculated rotation angle of the main shaft,
      determine whether or not the light receiving section has received the reflected laser beam,
      when a determination is made that the light receiving section has received the laser beam, calculate a distance Z from a machine origin to the measurement target using the equation $Z = \tan\theta \cdot D + C + q$, wherein $\tan\theta$ is the tangent value of the emission angle of the laser beam corresponding to the rotation angle of the main shaft as stored by the controller,
      D is a distance from the rotation axis L of the main shaft to the light receiving section in a direction perpendicular to the rotation axis L,
      C is a distance from the position control point of the main shaft to the light receiving section in a direction parallel to the rotation axis L, and
      q is a distance from the machine origin to the position control point of the main shaft, and
   determine, from the calculated distance Z, whether or not the measurement target and the machine tool interfere with each other.

* * * * *